June 28, 1938.  G. G. HAVENS  2,121,871

TIRE TREAD

Filed July 25, 1935

INVENTOR.
GLENN G. HAVENS

BY
ATTORNEY.

Patented June 28, 1938

2,121,871

UNITED STATES PATENT OFFICE 2,121,871

TIRE TREAD

Glenn G. Havens, Detroit, Mich., assignor to United States Rubber Products, Inc., New York, N. Y., a corporation of Delaware Application July 25, 1935, Serial No. 32,983

3 Claims. (Cl. 152—209)

My invention relates to tires, and in particular to the treads of pneumatic tires. More particularly, the invention relates to a tread construction whereby the tendency of the tread to pick up stones is considerably reduced.

In the design of pneumatic tire treads the current tendency is toward decreasing the width of the ribs or rows of antiskid elements, and increasing the number of ribs and/or rows of tread elements. As a result of this construction, the ribs or rows of elements become more flexible laterally, thus increasing the tendency of the tire to pick up stones or other objects and to retain them.

Stone retention within the grooves of the treads of pneumatic tires produces surface tension at the base of the grooves and induces cracking at this locality. In addition, stones which are picked up on a gravel road and retained by the tread cause an objectionable noise when the tire is run on smooth pavement.

It is, therefore, an object of my invention to provide a pneumatic tire tread which is substantially free from picking up and retaining stones and/or other hard objects.

A further object of the invention is to provide means for preventing stone pick-up without detracting from the appearance of the tire.

These objects will be more apparent from the following detailed description when considered in connection with the accompanying drawing, in which:—

Figure 1:
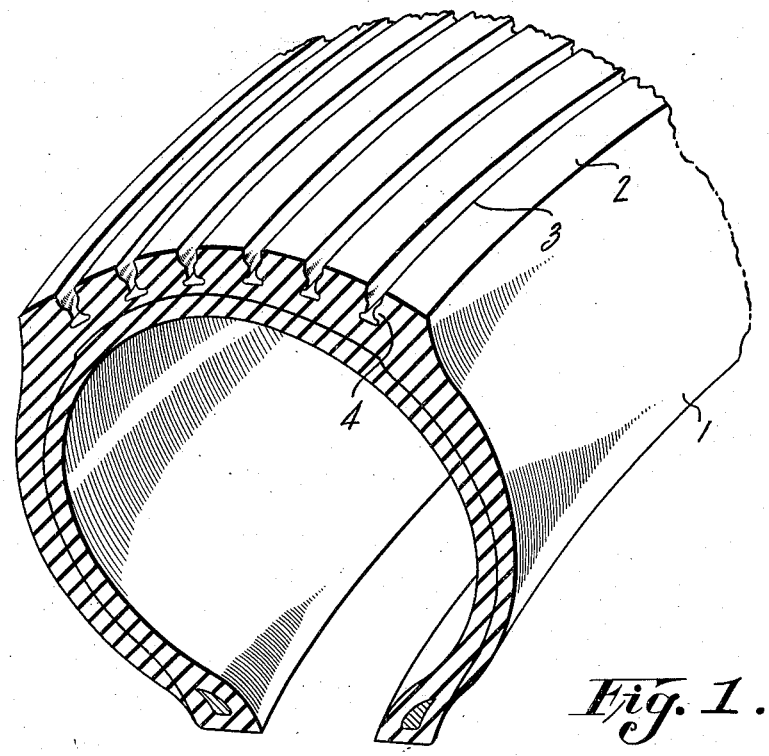
Fig. 1 is a perspective view, in section of a portion of a pneumatic tire embodying my invention.

In Fig. 1, I show a pneumatic tire 1 of conventional construction having a plurality of ribs 2 extending circumferentially around the crown of the tire 1 and defining grooves 3. The ribs 2 may represent continuous members, or they may be broken up to form rows of blocks or other anti-skid elements.

It will be noted that the tread of the tire 1 is composed of seven ribs, thus indicating that the width of each rib is somewhat less than the heretofore conventional ribs. A type of tread such as herein illustrated is shown in particular in my copending application, Serial Number 4,600, filed February 2, 1935.

Narrow ribs, because of their lateral flexibility upon engagement with stones, while running on a gravel road, are more easily moved apart and permit the stones to become lodged and retained within the grooves between the ribs. In order to overcome this objectionable feature, I provide circumferential projections 4 extending from the sides of the ribs between the top of the tread and the base of the grooves. The projections are not adjacent to the bases of the grooves for the reason that it is desirable to maintain the bases of the grooves of a definite width in order to prevent tread cracking at the groove bases.

Figure 2:
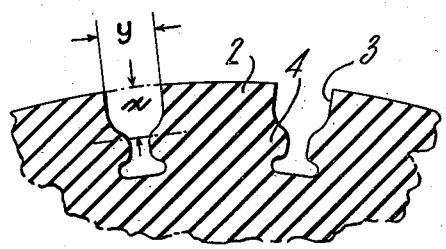
Fig. 2 is an enlarged transverse view, in section, of a portion of the tread shown in Fig. 1.

I also find it advisable to maintain the upper limit of each projection 4 a distance from the top of the tread substantially equal to the width of the groove between the adjacent ribs 2. In other words, as shown in Fig. 2, the distance X should be substantially equal to the width Y.

The projections 4 need not be continuous, but where plain ribs are used in the tread configuration the projections 4 should be continuous or substantially continuous in the direction of the groove walls. However, when the tread is broken up to form rows of antiskid elements, the projections 4 may be of a length or lengths in conformity with the length of the various antiskid elements.

As an example of the efficiency of tires embodying my invention, tests were conducted in which the tires were run on gravel at a speed of twenty-five miles per hour for two miles, and the stones which were retained in the grooves of the tread were then counted. Next, the tires were run a distance of one mile on concrete, and the remaining stones again counted. The number of stones retained in the tread at the end of one mile on concrete, divided by the number of stones at the end of two miles on gravel, gives the percentage of retention. On this basis, the various treads were found to have the following ratings of efficiency, both in picking up stones and in retaining them:

14 row ribbed tires—pick-up 1%—retention 50%
10 row ribbed tires—pick-up 3%—retention 60%
7 row ribbed tires—pick-up 11%—retention 77%
Standard, conventional tires of the general type shown in Sloman Design Patent No. 85,063, September 8, 1931—
        pick-up 100%—retention 100%

Tires of present invention—
Pick-up ⅕ of the number of stones picked up by a conventional tire, or 500% efficiency
Retention ⅕ or 500% efficiency in comparison with a conventional tire.

Thus it is demonstrated that a tire embodying the features of my invention operates at a relatively high degree of efficiency to prevent stones from becoming lodged within the grooves between the ribs or rows of antiskid elements, by reason of the position and functioning of the projections 4 relative to the width of the groove between the ribs 2.

Figure 3:
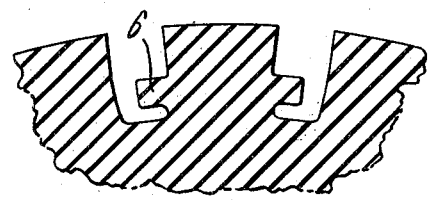
Fig. 3 is a similar view illustrating a modification of the invention.

In place of the double projections, shown in Fig. 2, the advantages of the invention may be obtained by a single projection 6 extending from one of the side-walls of the groove, as shown in Fig. 3.

In the several embodiments of the invention, obstacles are placed in the paths of stones entering tread grooves between adjacent ribs while retaining the normal widths of the tread grooves at their bases, thereby reducing stone pick-up with a corresponding reduction in noise and deterioration of the rubber in the grooves, particularly at their bases.

While I have shown and described certain preferred embodiments of my invention, it will be understood that other modifications may be made therein within the spirit of the invention and the scope of the appended claims.

Having thus described my invention, what I claim and desire to protect by Letters Patent is:—

1. A pneumatic tire having a tread comprising a plurality of circumferentially extending traction elements defining grooves, and one or more projections extending laterally from the sides of the traction elements to form restrictions between the openings and the bases of said grooves, said projections being spaced from the bases of the grooves, and the outward principal surfaces of said projections being spaced from the road engaging surfaces of the traction elements a distance substantially equal to the width of said grooves.

2. A pneumatic tire having a tread comprising at least seven circumferentially extending ribs defining grooves, and one or more circumferential projections extending laterally from the sides of the ribs to form restrictions between the opening and the bases of said grooves, said projections being spaced from the bases of the grooves, and the outward principal surface of said projections being spaced from the road engaging surfaces of the ribs a distance substantially equal to the width of said grooves.

3. In a pneumatic tire for vehicles, a rubber tread comprising grooves some of which have overhanging ribs to provide a restricted width between their openings and the bases spaced from the groove openings a distance at least equal to the width of the grooves.

GLENN G. HAVENS.